Jan. 13, 1925.　　　　　　　　　　　　　　　1,523,118
W. H. GREEN
PROCESS AND APPARATUS FOR MIXING AND FEEDING
CHEMICALS FOR WATER TREATMENT
Filed April 1, 1921　　　2 Sheets-Sheet 1
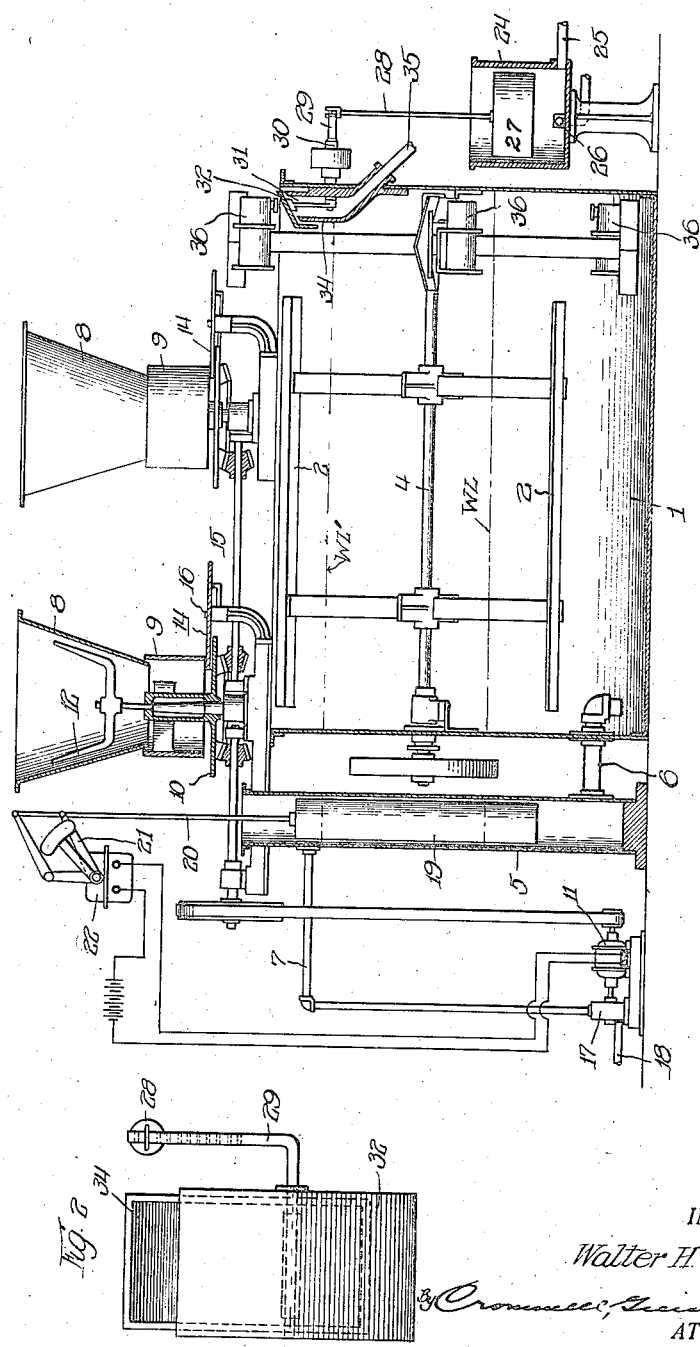
INVENTOR.
Walter H. Green,
ATTORNEYS.

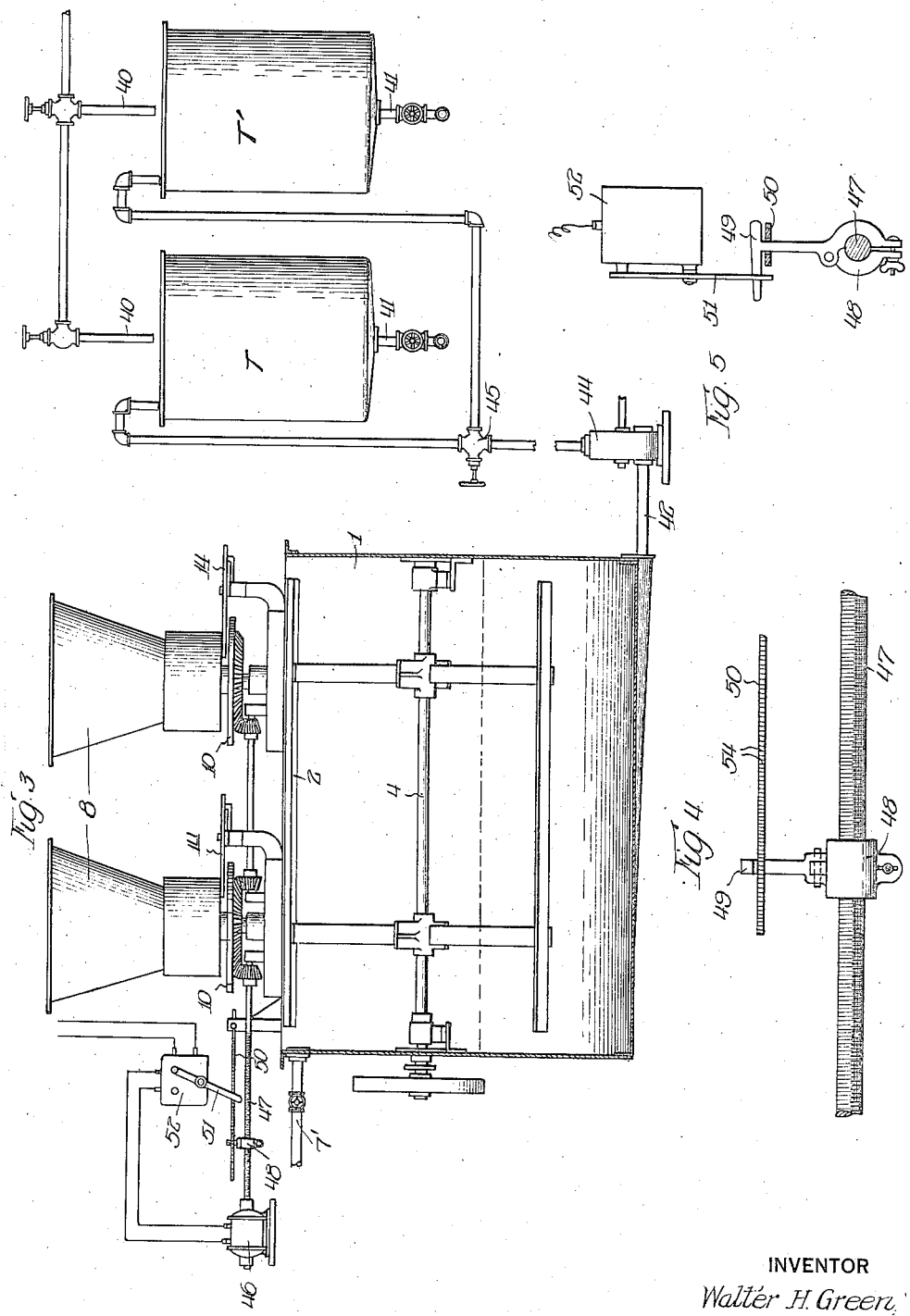

Patented Jan. 13, 1925.

1,523,118

UNITED STATES PATENT OFFICE.

WALTER H. GREEN, OF CHICAGO, ILLINOIS, ASSIGNOR TO INTERNATIONAL FILTER CO., OF CHICAGO, ILLINOIS, A CORPORATION OF ILLINOIS.

PROCESS AND APPARATUS FOR MIXING AND FEEDING CHEMICALS FOR WATER TREATMENT.

Application filed April 1, 1921. Serial No. 457,780.

*To all whom it may concern:*

Be it known that I, WALTER H. GREEN, a citizen of the United States, residing at Chicago, in the county of Cook and State of Illinois, have invented certain new and useful Improvements in Processes and Apparatus for Mixing and Feeding Chemicals for Water Treatment, of which the following is a specification.

This invention is directed primarily to the water softening art, and relates to a new process and an improved organization of mechanism for the treatment of water with chemical agents for the purpose of fitting it for intended uses.

In the treatment of water for the purpose of softening it to fit it for various commercial uses wherein a large and substantially continuous supply of water is required, it is important that all of the water required for use be given adequate treatment, and that there be no delay or hiatus in the output of modified water such as would interrupt or interfere with the operation of the plant or other source of demand which is dependent upon such supply. Were there no variations in the nature or chemical content of the raw water, the maintenance of an adequate supply of modified water would not present a particularly difficult problem, and the requirements under such conditions might be met more or less satisfactorily by practices and apparatus now in use. In the conditions actually obtaining, however, in the majority of situations where softening treatment of water is necessary or desirable, the raw water as obtained from the source of supply is subject to quite material variations from time to time, and in many instances such variations or changes in the nature or chemical content of the raw water take place very suddenly. This is particularly true where the source of supply is a stream whose different tributaries have basins possessing different predominating chemical characteristics. In such situations the water of the stream is quickly responsive to changes in the proportionate discharge of its tributaries, as rainfall in the basin of one of the tributaries predominating in a certain chemical characteristic, will increase the proportion of such chemical in the water of the main stream. As a result, a treatment or dosage adequate for one condition of the supply stream may become suddenly excessive or inadequate for the proper modification of the water, due to a more or less sudden and material change in the nature or quantity of the material which it carries in solution. Such contingencies might be provided for by the maintenance of a sufficiently large reserve of treated water to supply the contemplated demand for a period sufficient to permit retreatment of water which, due to a sudden change in the nature of the raw water, had been found by test to be improperly or inadequately modified. This is practical, however, only where the demand for treated water is small. The only practical and satisfactory solution of the general problem, therefore, resides in the provision of a method of treatment whereby the dosage may be accommodated to the condition of the water at all times, variations in the dosage being made substantially in consonance with variations in the chemical content of the raw water. Present apparatus and present practice do not always accomplish such results, and this is due to the practical impossibility in obtaining with them a quick change in the proportion or amount of treating material supplied per unit to the raw water. In the present intermittent systems, so called, a certain quantity of raw water is taken, and treating materials in proper amount to secure the intended reactions are placed in such quantity or batch of water. It is then held or handled in suitable fashion to induce or permit the intended reactions, upon the completion of which it is drawn off for reserve storage or use. This requires much space both for storage of reserve supplies of modified water and for retention of the batches of water undergoing treatment. In so-called continuous systems employed in present practice, a batch of dosing material is made up, based upon a test of the raw water, and is fed to the raw water in proportion to its quantity. Due to practical considerations, the customary requirements are that this batch be sufficient for a run of eight, twelve, or twenty-four hours. Inasmuch as the character of the raw water may change at any moment within the shortest of these periods, it is obvious that the treatment might be wrong during substantially the entire period,—as for example, if the water should change thirty minutes after the batch had been prepared, the treatment would be wrong during the seven and one-half hours required to use up the balance of an eight-hour batch. The changing of the batch, once mixed, in order to meet changes in the water condition, is attended with circumstances which make impossible any assurance of accuracy. For example, if, after a batch has been mixed at a certain strength, a change in the supply water takes place, and it is desired to change the treating mixture to accord with the new requirements of the water, it is necessary to determine as closely as possible the amount of the batch remaining, figure the change in strength, as between two or three constituents, of the dosing mixture necessary to give the right strength for the new condition of the raw water, figure the amounts of the different constituents of the treating mixture necessary to be added to the quantity in the batch to bring the entire quantity to the proper strength, measure out such estimated quantities of said various constituents,—while the quantity remaining in the batch meanwhile is being continuously changed by withdrawal from it for the treatment of the water,—add these new quantities of the constituents to the mixture in the tank, and mix them with it. In addition to requiring highly expert knowledge and ability, such a proceeding is slow, is attended with the great inconvenience and highly disagreeable conditions incident to the handling of such materials as lime, soda and the like, is entirely a sporadic or periodical performance, to be made only when conditions are such as to absolutely require it, and is inaccurate, unscientific and impractical.

The present invention accomplishes the solution of the problem by a method wherein the requisite treating materials are supplied and brought together continuously in predetermined proportions, said proportions being susceptible of intentional variation at any time and accurately in small degrees during the operation by which they are brought together. The proportions of the treating materials thus being definitely established and controlled at all times, and such materials being brought together in the established proportions continuously, they are mixed together in such fashion as to secure a proper treating or dosing mixture of such nature and consistency as to be readily handled, and be easily and accurately apportioned in quantities to the supply of raw water, in such fashion that such apportionment may be controlled directly and automatically by the quantity of raw water supplied. This method provides a continuous process, which, in actual practice, eliminates the preparation or use of a batch of treating material, thereby avoiding the limitations imposed by such practice; reduces the size of mixing tanks, etc. necessary for the preparation of the treating mixture; eliminates the personal element incident to determining and measuring the quantities of treating material necessary to rectify the dosing mixture; permits an immediate change in the strength or proportion of any of a number of constituents in the dosing mixture; permits the taking of a sample immediately from the raw water as soon as the rectified dosage has been mixed with it; completely eliminates the necessity for retreatment of raw water, and thereby eliminates the requirement for the maintenance or storage of a reserve of modified water; and at all times maintains the range of variations in treatment between extremely narrow limits.

By certain modifications in the apparatus, it may be adapted to function automatically to prepare a predetermined amount of treating material, without requiring the handling of the chemicals in connection with weighing or measuring them or disposing them in the mixing tank. In such modified form, the apparatus is adapted to prepare accurately the desired amount of treating material, which amount is selectively variable in accordance with the preliminary setting of the apparatus.

One general purpose of the invention is the provision of a process for supplying treating materials to a changing quantity of water or other liquid to be treated, in such fashion as to maintain the proper proportion of the treating material to raw water to secure the intended reactions in the water at all times.

Another object of the invention is the provision of a new process of treating water whereby changes in the proportions of different treating materials utilized to form a treating mixture may be made substantially in consonance with changes in the nature of the water, and the treating materials supplied to the raw water in the desired proportions.

Another purpose of the invention is the provision of a process which may be carried out continuously and automatically without intelligent supervision.

Another purpose of the invention is the provision of an improved apparatus whereby water may be treated in a continuous process, which apparatus is adapted for automatic control and operation for the preparation of a treating mixture in conjunction with the supplying of such treating mixture to the raw water.

Another object of the invention is the provision of an apparatus which is operable automatically to maintain a proper supply of treating material for intended requirements, and to feed such treating material to raw water in accordance with the demands thereof.

Another object of the invention is the provision of apparatus which is operable automatically to bring treating materials together in proper proportions and combine them to form a treating mixture, and which maintains such proportions constantly over intended periods of time, and in which the proportions may be varied from time to time as desired.

A still further object of the invention is the provision of an apparatus which is adapted to prepare a treating mixture, such as a solution of lime in water, or the like, automatically, thereby obviating the necessity for intelligent supervision of the weighing or measuring of the constituents of the mixture, eliminating thereby the opportunity of error due to mistake or lack of skill on the part of the person doing the measuring, and eliminating also the unpleasant and trying conditions attendant upon the handling of various materials customarily used in treating water.

A still further object of the invention is the provision of an apparatus which is adapted to prepare a batch of treating mixture, such as a solution of lime in water, or the like, of predetermined amount, and by automatic operations for effecting the handling of the material and its measuring, thereby eliminating the possibility of mistake in weighing or measuring, and also avoiding the unpleasant conditions incident to the handling of powdered chemicals.

Another object of the invention is the provision of an apparatus which may be manufactured and operated economically, which requires small space for installation, which may be utilized in conjunction with equipment of types now commonly in use, and which secures an intimate and effective combination of the treating materials to provide a superior dosing mixture.

Other and further objects of the invention will be pointed out hereinafter, will be indicated in the appended claims, or will be obvious to one skilled in the art upon a fuller understanding of the present disclosure, which is here made by reference to an illustrative form of apparatus by which the improved method may be practiced. It is to be understood that my improved method is not dependent upon the particular apparatus shown, or upon any particular form of apparatus; and it is also to be understood that the various elements of the mechanism shown may be changed in detail or in organization, or by substitution, without sacrifice of the essential features and combination constituting my invention as defined in the claims.

In the drawings,—

Fig. 1 is a sectional elevation of an apparatus embodying my invention in means, and by which my invention in process may be practiced, the illustration being diagrammatic for the most part;

Fig. 2 is a part top view of the dose measuring apparatus constituting an element of the organization shown in Fig. 1;

Fig. 3 is a diagrammatic sectional elevation of an apparatus for treating water in batches, the same embodying a modified form of my invention;

Fig. 4 is a detail of the operation controlling mechanism; and

Fig. 5 is another detail of the same illustrating the selective setting element.

Referring to these drawings in detail by means of the reference characters applied, it is to be understood that the mechanism shown is designed for installation in association with a suitable tank into which raw water may be fed and from which the water may be withdrawn, and in which tank the raw water may be subjected to the necessary mixing or contact with the treating or dosing material, and in which tank also the intended reaction in the water consequent upon which such dosage may be permitted to take place. It will readily be understood by one skilled in the art that the supply water may be fed into such a tank at any predetermined or desirable rate, and that the control of the tank may be such that it is filled and emptied periodically, or in association with other similar tanks, or that the circulation or movement of the water during treatment may be continuous through the tank. It will be understood also that in association with such tank there may be installed a heating apparatus whereby the water may be heated either before or after dosing for the purpose of influencing or expediting the reaction of the treating materials thereupon. Such elements being well known parts or adjuncts of water softening apparatus, they are not here illustrated. In association with such, or equivalent elements, is installed a mixing tank 1 which is preferably of relatively small capacity so that the nature of its contents may be modified or changed quickly incident to supply of material thereinto and withdrawal of the dosing mixture therefrom. In this tank is disposed suitable mixing means 2, here shown as rotary beaters carried on a shaft 4, by operation of which material in the tank may be energetically whipped up and stirred continuously, for the purpose of securing an intimate and uniform commingling of its constituents. In association with tank 1 is disposed a float tank 5 having communication with said tank by means of a conduit 6, and arranged to be supplied with liquid through an inlet pipe 7. Also in association with tank 1 is disposed a continuously operable charging means adapted to handle the treating materials appropriate for use to accomplish the purpose of the apparatus. This charging means is here illustrated by elements designed to effect continuous measured feed of chemical or pulverulent material, as commonly in use for softening water, which elements as here shown include a hopper 8 in which the material is placed and from which it is discharged into a vertically disposed cylinder 9, the lower end of which is above and spaced apart from the discharge plate 10. The cylinder 9 together with the plate 10 are designed to be rotated by means of suitable transmission connections and gearing driven by a motor 11, incident to which operation the material is fed from the hopper 8 into the cylinder 9 and upon the plate 10 by the stirring action of revolving arms 12. In association with the plate 10 and cylinder 9 is disposed an adjustable separator or deflector 14 in the nature of a plate or arm adjustably mounted on a bracket 15 by means 16, whereby the extent to which the separator projects across the plate under the cylinder 9 may be varied. The angular disposal of the deflector 14 is such that it deflects off of the plate 10 such of the material fed down through the cylinder 9 as comes in front of it, and discharges such proportion of the material into the tank. The operation of the apparatus being continuous, it will be obvious, therefore, that such supply of the treating material into the tank 1 will be continuous, and that it will be constant in amount. I have shown in elevation a second one of these feeding elements, it being obvious that these chemicals or treating materials may be thus supplied continuously into the tank 1 in different amounts, said amounts being subject to immediate change at any time to vary the proportion of said materials, the speed of operation of the two elements being synchronous due to their common drive from the prime mover 11. Operated by the motor 11 in conjunction with the means for supplying the pulverulent materials, and forming a part of the charging means, is a continuously operable pump 17 which is supplied from a suitable source by means of conduit 18, with a suitable vehicle or solvent adapted for mixture or combination with the pulverulent materials to form a liquid or fluid treating or dosing mixture. Under ordinary circumstances, of course, this vehicle is water of proper purity. The rate at which the vehicle is supplied into the float tank 5, at a given speed of the motor, is constant, just as the rate at which the pulverulent material is supplied into the tank 1 at a given adjustment of the deflector 14 and a given speed of motor 11, is constant, so that the proportion of vehicle and treating material fed will remain constant, even at varying speeds of the motor 11, such variations in speed of the motor affecting both the pump and the feeding element to equal degree. The flow of the vehicle from the float tank 5 into the mixing tank 1 is at the rate determined by the operation of the pump, so that the vehicle and the treating materials are brought together in the mixing tank continuously and in constant ratio. The tank 5 is employed for the purpose of affording a maximum and minimum control for the apparatus. The water level in the float tank 5 will always be the same as the water level in the mixing tank 1, and thus will be a true indication of the amount of material in the latter. In the float tank is a float 19, the elevation of which, obviously, is controlled by the water level in the tanks. This float is operably connected by a link 20 and lever 21 with a weight operated switch 22 which controls the energization of the motor 11. Considering the line WL' as the maximum water level of the apparatus, and the line WL as the minimum water level, the arrangement of this float is such that upon the water in the tank 5 reaching the maximum water level, the switch 22 will be opened to stop operation of the motor, while upon its reaching the level WL, the position of the float will be such as to close the switch and start operation of the motor. In this fashion the apparatus is rendered independent of supervision so far as the maintenance of an adequate quantity of dosing mixture is concerned, and the avoidance of flooding. The position and size of the conduit 6 are such that it will induce at all times a circulation from the float tank into the mixing tank, so that there always will be a flow of the fresh vehicle into the mixing tank, and there will never be a backflow which will carry part of the treating materials into the float tank. Incident to the bringing together of the vehicle and the treating material in the mixing tank, the operation of the mixing device 2 maintains a constant agitation so that the vehicle and treating materials are combined uniformly and continuously to constitute a uniform fluid dosing mixture.

Measuring means is provided for supplying this dosing mixture to the raw water in such proportion as may be desired, the arrangement being such that the proper proportion of dosing mixture to raw water is constantly and automatically maintained. This means as illustrated, includes, in association with the mixing tank aforementioned in which the raw water and dosing mixture are brought together, a float pot 24 which is supplied with water through a conduit 25 constituting a by-pass from a weir box or the like, whereby a certain proportion of the water in the course of supply to the mixing tank is conducted to the pot 24. The discharge from the pot 24 being controlled by an orifice 26, the level of water in the pot at a given time will bear a direct relation to the quantity being supplied to the mixing tank. Such an arrangement is familiar in the art. The pot 24 accommodates a float 27 which is connected by a link 28 to a crank 29 and arranged to rock a shaft 30 which carries an arm 31 bearing a cover plate 32 which controls the inlet opening of a discharge funnel 34. From this funnel a discharge pipe 35 leads to the tank in which the dosing mixture is combined with the raw water, or to a pump which in turn supplies the dosing mixture to such tank. Operating in the mixing tank 1 in association with the discharge funnel 34 is a discharge mechanism comprising the buckets or dippers 36 arranged for continuous operation to dip the dosing mixture from the tank and discharge it over the discharge funnel 34. The amount of the dosing mixture which is received by the funnel 34, however, is controlled by the position of the cover plate 32, which, in turn, is controlled by the height of the water in the pot 24. In this fashion the feed of the dosing mixture to the raw water is accurately maintained at the proper proportion automatically, and irrespective of variations in the rate of supply of the raw water, so that the bringing together of the raw water and the dosing mixture may be carried on continuously. The quantity of dosing mixture taken by the discharge funnel 34 at a given position of the float 27 may be varied by changes in the radial adjustment of the float rod 28 on the crank 29.

From the foregoing description of apparatus, it will be observed that it is adapted for the practice of my improved method, and it will be understood from the foregoing that said method resides in the operations of continuously supplying the desired treating materials and vehicle in predetermined proportions, which proportions are variable at selection, in agitating the vehicle and treating materials together so that they will unite to form a dosing or treating mixture which may be conveniently apportioned and handled, and then in supplying such dosing mixture to the water to be treated in proportion to the quantity or rate of supply thereof, said bringing together of the dosing mixture and raw water preferably being conducted as a continuous operation, but susceptible of practice as an intermittent operation. It is further to be observed that the process contemplates the regulation of the treatment of the raw water by the necessary variation in proportions of the various treating materials and the vehicle supplied for the mixing operation, whereby proper changes in the treatment to suit the water may be made while the feed of the dosing mixture to the raw water may be maintained under automatic control of the water supply.

In designating the operations of bringing together the water and the treating materials as "continuous" it is not to be understood thereby that I mean that the operation of the pump and feeding elements are incessant, but that the supply of treating material and vehicle is adapted to go on continuously during periods of selected or variable durations, in the course of which the proportions of the vehicle and treating material supplied may be kept in constant ratio. It is also to be understood that where I refer to "treating material" that the term is used generally and may include not only the pulverulent material but also the liquid with which it is combined.

It is to be observed further that in the operation of the illustrative apparatus as above described, the supply of water and treating materials is maintained in proper proportion irrespective of variations in voltage in the supply system of the motor, while the proportions of the various constituents which go to make up the dosing mixture, are subject to instant and selective variation by adjustment of the separators 14. Due to the fact that the process may be carried on by this apparatus as a continuous process, the mixing tank may be made of comparatively small capacity, as there is no necessity for the maintenance of a large reserve of the dosing mixture; and because of this fact, any change in the relative proportions of the constituents fed into the tank has an immediate and intended effect upon the strength of the dosing mixture discharged from the tank. By virtue of this fact, any sudden change in the nature of the raw water may be accommodated immediately with a change in the dosing mixture, and such rectified dosing mixture applied immediately to the raw water requiring it. By practice of this process, as by use of this apparatus, therefore, the range of variation in the treatment of water may be maintained within very narrow limits approximating the correct amount.

In Fig. 3 is illustrated a modification of my improved apparatus such as is adapted for use in preparing successive batches of treating material of predetermined amounts. This modification may be utilized effectively in conjunction with an intermittent treating system. In the diagrammatic illustration, the characters T and T' designate treating tanks (here illustrated in greatly reduced proportionate size) into which charges of raw water of predetermined amounts may be introduced through feed inlets 40 and withdrawn through outlets 41. It is contemplated that while the water in one tank is undergoing treatment, that in the other will be withdrawn and replaced. The mixing tank 1 is installed in conjunction with the apparatus and is connected thereto by the chemical feed pipe 42 which leads to a pump 44 from which the discharge of the treating mixture to tanks T and T' may be controlled by a three-way valve 45. The mixing tank contains the agitators 2 and may be supplied with water through an inlet 7' and with chemicals by the feeding devices corresponding to those illustrated in Fig. 1, and including the hoppers 8, rotating tables 10 and the adjustable separating members 14. The feeding elements are operated from a suitable source such as the motor 46 by means of transmission connections which may include a shaft 47. Tanks T and T' normally are much larger than tank 1.

It being the purpose to treat the successive charges in the tanks T and T' with requisite amounts of chemicals to secure the desired reactions, the requirements of the raw water will be determined by suitable tests, and from the findings of such tests, the automatic mixing apparatus will be set to provide for each batch the requisite amount of chemicals. If the treating tanks are of different sizes, it will be necessary to mix larger batches for the larger tanks and smaller batches for the smaller tanks. The means for predetermining the amount of chemical to be provided for each batch, and the means for automatically supplying such predetermined amount of chemical, includes the adjustable separating members 14,—which, as above explained, may be set selectively to discharge into the tank a desired amount of chemical upon each revolution of the table 10,—and the operation determining device by which the total amount of chemical disposed in a batch with a given setting of the separator 14 may be predetermined, and the supplying of such total amount and no excess automatically secured. This operation determining device may be embodied in any of a great variety of forms. In the diagrammatic illustration in Figs. 3, 4 and 5 I have shown it as a switch throwing mechanism adapted to control the operation of the motor 46. In such embodiment it includes the transmission shaft 47, which is screw-threaded and adapted to transmit longitudinally thereon, incident to its operation by the motor 46, an adjustable nut 48. This nut is illustrated in Fig. 5 as being of segmental construction, whereby it may be moved out of the thread of the shaft 47 and set into the thread at any point longitudinally of said shaft. This nut carries a switch throwing arm 49, and is supported and guided for movement longitudinally of the shaft 47 by a guide 50. In the path of the switch throwing arm 49 is disposed a switch lever 51 which controls the switch 52 whereby the energizing circuit of the motor 46 may be closed and opened. The switch being in closed position, as illustrated in Fig. 3, the cooperation of the arm 49 with the switch lever incident to the transmittal of the nut 48 during the rotation of shaft 49 will be effective to open the switch, resulting in the stopping of the motor 46 and the discontinuing of the feed of chemical into the tank. Inasmuch as the nut 48 may be set at any point on the shaft 47 in advance of the switch lever 51, the entire number of operations prior to the automatic stopping of the feed may be accurately predetermined by the positioning of the nut. As an indicator for aiding in the positioning of the nut, the guide 50 may be provided with a scale or calibration illustrated at 54.

In operation, the hoppers 8 being supplied with the desired chemicals, the nut 48 is set to permit the desired number of rotations of the tables 10 to secure the requisite feed of chemical to supply the batch of raw water to be fed into one of the treating tanks. The switch is then closed, and the feed of chemical thereby started. The apparatus then continues to operate as above described, feeding the chemical into the tank at a constant rate, mixing it there with a vehicle such as water, thereby preparing the treating material. This operation continues until it is automatically stopped by the mechanism above described when the predetermined amount of chemical has been fed. When a batch of water is charged into one of the treating tanks, the batch of treating material thus prepared for it is withdrawn from the tank by the pump 44 and discharged into the treating tank with the batch of water. The apparatus is then set and started as above described to prepare the batch of treating material for the next tank. In this fashion accurately measured batches of treating material are formed automatically, without requiring the handling of the material or supervision during the preparation of the batch.

I claim:

1. A method of treating raw water or the like, which consists in continuously combining a treating material and vehicle in predetermined proportions, independently of the rate of raw water supply, to provide a dosing mixture, and thereafter proportioning and continuously feeding such dosing mixture to the raw water in proportion to the supply thereof.

2. A method of treating raw water or the like, which consists in continuously combining a treating material and vehicle in predetermined proportions to provide a dosing mixture, thereafter proportioning and continuously feeding such dosing mixture to the raw water in proportion to the supply thereof, and varying the relative proportions of treating material and vehicle in accordance with the dosage requirements of the raw water.

3. A method of treating raw water or the like, which consists in continuously combining a treating material and vehicle in predetermined proportions, independently of the rate of raw water supply, to provide a dosing mixture, thereafter proportioning and feeding such dosing mixture to the raw water in proportion to the supply thereof, and varying the proportions of treating material and vehicle in accordance with the dosage requirements of the raw water.

4. A method of treating water and the like, which consists in continuously combining treating material and a vehicle in predetermined proportions, independently of the rate of raw water supply, to provide a dosing mixture, thereafter proportioning and continuously feeding the dosing mixture to the raw water in proportion to the supply thereof, and regulating such feed of the dosing mixture by such supply of raw water.

5. A method of treating raw water or the like, which consists in continuously mixing a treating material and vehicle in predetermined proportions independently of the rate of raw water supply, to provide a dosing mixture, feeding such dosing mixture to the raw water in proportion to the supply thereof, varying the proportions of treating material and vehicle in accordance with the dosage requirements of the raw water, and regulating the feed of the dosing mixture by the supply of raw water.

6. A method of conducting treatment of water and the like, which consists in continuously supplying a treating material and a vehicle in proportions according to the dosage requirements of the raw water, continuously agitating the treating material and vehicle together to provide a dosing mixture, and continuously feeding the dosing mixture from the zone of agitation to the raw water in quantity proportionate to the supply of the latter.

7. The method of treating water and the like, which consists in supplying a treating material and a vehicle, continuously agitating the treating material and vehicle together to provide a dosing mixture, and continuously feeding the dosing mixture from the zone of agitation to the raw water in quantity according to the dosage requirements thereof, and thereby controlling the supply of treating material and vehicle.

8. The method of treating raw water and the like, which consists in supplying a treating material and a vehicle in proportions according to the dosage requirements of the raw water, continuously agitating the treating material and vehicle together to provide a dosing mixture, feeding the dosing mixture from the zone of agitation to the raw water, controlling such feed of dosing mixture by the raw water supplied for treatment, and controlling the supply of treating material and vehicle by such feeding of the dosing mixture to the raw water.

9. Water treating apparatus comprising the combination of a mixing tank, feeding means for continuously feeding into the same pulverulent material in constant quantity, supply means for continuously feeding into the tank a liquid in constant quantity, means for agitating the liquid and pulverulent material in the tank, and means operable continuously for measuring the resulting mixture out of the tank.

10. Water treating apparatus comprising the combination of a mixing tank, feeding means for continuously feeding into the same pulverulent material in constant quantity, supply means for continuously feeding into the tank a liquid in constant quantity, means for continuously agitating the liquid and pulverulent material in the tank, and means operable continuously for measuring the resulting mixture out of the tank.

11. Water treating apparatus comprising the combination of a mixing tank, feeding means for continuously feeding into the same pulverulent material in constant quantity, supply means for continuously feeding into the tank a liquid in constant quantity, means for agitating the liquid and pulverulent material in the tank, means operable continuously for measuring the resulting mixture out of the tank, and means for varying the proportionate feed of pulverulent material and liquid into the tank.

12. In apparatus of the class described, the combination of a tank, means operable for agitating material therein, means arranged for synchronous operation for feeding liquid and pulverulent material into the tank continuously, means associated therewith for varying the proportion of liquid and pulverulent material fed per unit of time, and means operable continuously for withdrawing the mixed liquid and pulverulent material from the tank.

13. In apparatus of the class described, the combination with a tank of means operable to agitate material therein continuously, means for withdrawing material from the tank, automatically controlled means for determining the amount of material withdrawn from the tank per unit of time, supply means operable continuously to feed different materials into the tank in constant quantities, and means rendered effective by material in the tank at different levels for stopping and starting the operation of the supply means.

14. An apparatus for treating water or the like comprising the combination of a mixing tank, means operable therein to mix materials disposed in the tank, means operable to withdraw the mixture from the tank in proportion to the supply of water to be treated, and means operable automatically to dispose treating materials in the tank in predetermined proportions.

15. An apparatus for treating water and the like comprising the combination of a tank, means for mixing materials in the tank, means operating automatically to withdraw the mixture from the tank in proportion to the amount of water supplied for treatment, charging means operating automatically to supply materials into the tank in constant proportion and means operable by material in the tank for controlling said charging means.

16. In apparatus for treating water and the like, the combination of a tank, means for mixing materials therein, measuring means for withdrawing material from said tank in proportion to the amount of water supplied for treatment, charging means operating to supply different materials into said tank in constant proportions, and means responsive to operation of the measuring means to control the charging means.

17. In apparatus for treating water and the like, the combination of a mixing tank, means for discharging treating material therefrom, means for feeding a liquid vehicle into said tank, means for automatically feeding pulverulent material into the tank in constant amount, means for mixing the pulverulent material and liquid vehicle within the tank, and means operable incident to the feeding of pulverulent material for controlling the feeding operation.

In testimony whereof I have hereunto subscribed my name in the presence of two subscribing witnesses.

WALTER H. GREEN.

Witnesses:
C. S. BUTLER,
FRANCES K. GILLESPIE.